Oct. 29, 1940.  C. W. SCHMIDT  2,219,535
PESSARY
Filed Sept. 13, 1937

Inventor:
Carl Wilhelm Schmidt

Patented Oct. 29, 1940

2,219,535

UNITED STATES PATENT OFFICE 2,219,535

PESSARY

Carl Wilhelm Schmidt, Nuremberg, Germany

Application September 13, 1937, Serial No. 163,522
In Germany November 14, 1935

1 Claim. (Cl. 128—127)

This invention relates to a pessary used as a holder of medicaments which medicaments are to be brought to the mouth of the uterus.

According to this invention the pessary is soluble in the vagina. For this purpose the pessary preferably consists of urea and a binding agent.

The pessaries hitherto known are made of solid materials which do not dissolve in the vagina, and therefore must be removed by hand, after having been applied.

It is evident that there is attained a great progress in medical practice, to have a pessary completely soluble in the vagina, and in no way affecting the inner sides of it. This effect is realised by the present invention.

Therapeutic capsules made of urea are known. But such capsules, furnished with stoppers and which melt under the heat and moisture of the body, or with covers removed by an effervescent powder contained in the capsule, cannot be properly applied to the mouth of the uterus for bringing to it medicaments, and therefore are not suitable for the purpose.

Figure 1:
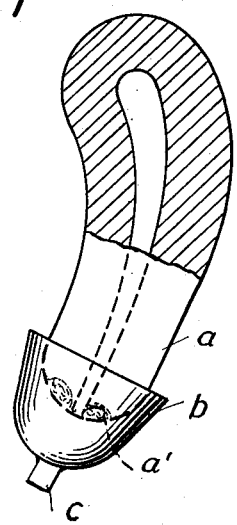
Figure 2:
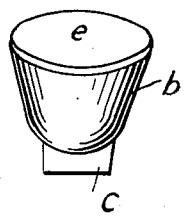
Figure 3:
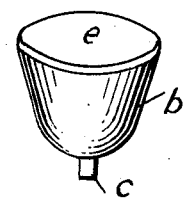
Figure 4:
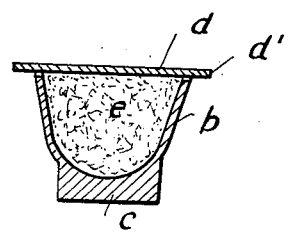

In the accompanying drawing an example of the invention is illustrated. Fig. 1 shows the appliance of the pessary to the mouth of the uterus. Figures 2 and 3 show the pessary itself, Figure 2 being a side view in perspective and Figure 3 being a front view in perspective. Fig. 4 shows a vertical section of the pessary with a medicament therein and a provisional cover thereon.

The pessary consists of a cup like shaped container $b$ having a flat fin-shaped piece $c$ at its bottom, this piece serving for handling the pessary when introducing it into the vagina. The opening of the container $b$ may be provisionally closed by a disc $d$ clinging to the medicament $e$ which has a salve like constitution. The disc $d$ can be removed by drawing or pushing it away in acting on its rim $d'$ projecting over the border of the container $b$ (see Fig. 4). Instead of the disc $d$ there may be applied a sheet of paper clinging to the salve $e$ and easily drawn away when the pessary is intended to be applied.

The container $b$ consisting of a material soluble in the vagina, preferably is made of urea and a binding agent for instance agar-agar added in a small quantity (3–4 p. c. of the whole container).

The container made of urea has the advantage that it dissolves in the vagina rapidly and without any remainders. Urea being a substance inherent to the human body, the pessary made of urea, after its solution in the vagina, does not harm the members of the body to which it is applied.

The container $b$ is filled with the medicament $e$, and then closed by the disc $d$ or by a sheet of paper.

When the pessary is to be used by the doctor, at first the container $b$ is opened by removing the disc $d$. Then the pessary being held by the handle piece $c$, is introduced into the vagina and brought to the uterus in such a manner that its open side is put upon the mouth of the uterus, as shown by Fig. 1, wherein $a$ represents the uterus. As seen in the drawing, the pessary $b$ is shaped like a cup with an interior diameter slightly larger than that of the uterus, so as to embrace the end of the same. Thereby the mouth of the uterus enters into the opening of the container $b$, the sores $a'$ of the uterus being brought in contact with the medicament $e$. The curved exterior of the pessary is shaped to fit against the wall of the vagina whereby the cup-shaped portion is held against the mouth of the uterus.

The pessary used in this manner, remains in the uterus, while being dissolved, the medicament $e$ continually acting to the sores $a'$. The container $b$ being made of urea, dissolves in the vagina without remainders. The pessary being made mainly of urea, it has no detrimental effect to the inner sides of the vagina and causes no ache or sanitary damage. The handle piece $c$ being also made mainly of urea and forming part of the container $b$, also dissolves completely.

I have described an embodiment of my invention, but it will be clear that changes may be made within the principle of the invention described, without departing from the scope of the subjoined claim.

Having now described my invention, what I claim is:

A pessary adapted for use in the treatment of the uterus comprising a cup-shaped body portion filled with medicaments and tapering into a fin-shaped handle which is integral with said body, the handle being adapted to be gripped by the hand for insertion of the pessary, said cup-shaped body portion being shaped to fit over the end of the uterus, said body portion and said handle being completely soluble in the fluids of the body and being composed of urea with about 3 to 4 per cent of agar agar incorporated therewith.

CARL WILHELM SCHMIDT.